Sept. 30, 1958    H. L. SUNDERMANN    2,854,255
COLLAPSIBLE TOWING FRAME FOR SERVICE TRUCKS
Filed Dec. 17, 1956
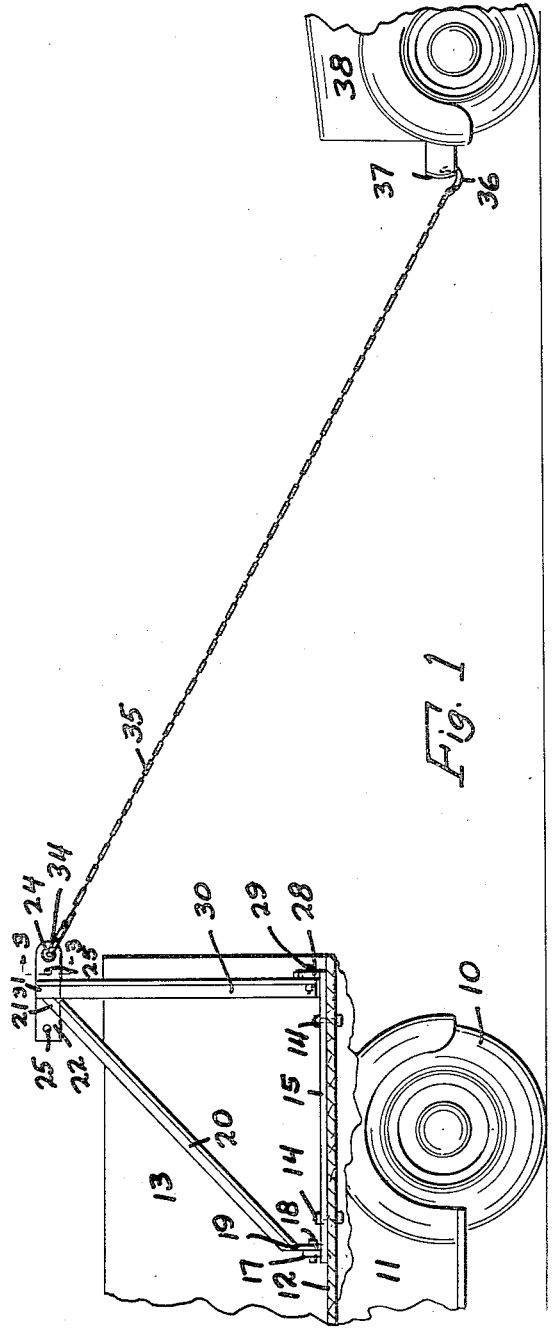
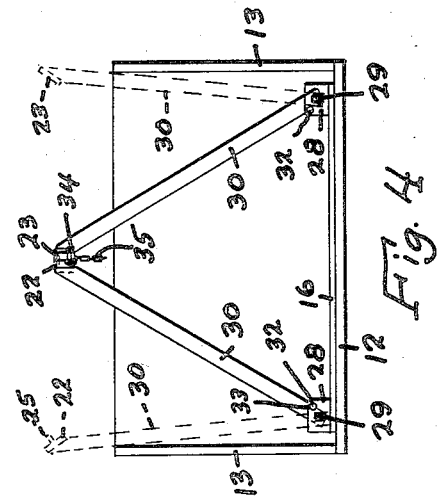
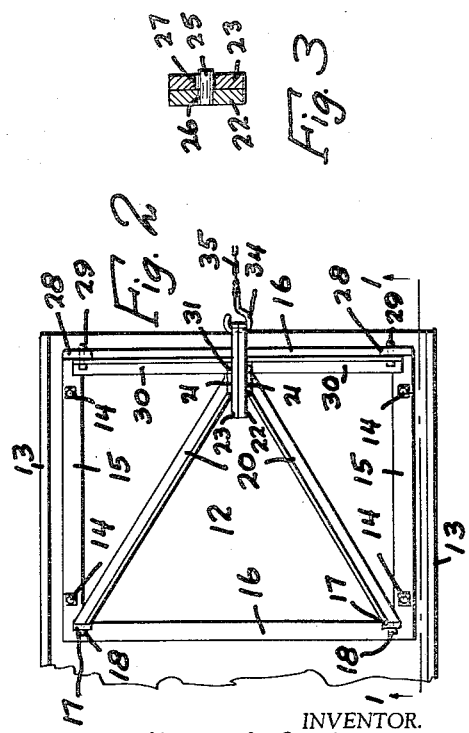
INVENTOR.
Henry L. Sundermann
BY Sam J. Slotky
ATTORNEY

2,854,255

COLLAPSIBLE TOWING FRAME FOR SERVICE TRUCKS

Henry L. Sundermann, Sioux Falls, S. Dak.

Application December 17, 1956, Serial No. 628,913

2 Claims. (Cl. 280—491)

My invention relates to a towing arrangement for service trucks.

An object of my invention is to provide a collapsible arrangement which can be spread apart in the service truck so that the other items can be stored in the truck when the truck is not being used for towing purposes.

A further object of my invention is to provide an arrangement which is sturdy in construction, and which will pull a maximum load without distortion of the frame, and which will exert a partially lifting effort on the towed vehicle, and which can be manufactured at a reasonable cost.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the arrangement, partially taken in section along the line 1—1 of Figure 2, Figure 2 is a plan view of a portion of Figure 1, Figure 3 is an enlarged section taken along the lines 3—3 of Figure 1, and Figure 4 is a rear view of the service truck with the towing device.

My invention contemplates the provision of a simple towing arrangement which can be pivoted to one side within a truck so that it will be completely out of the way for other purposes than towing, and which can then be readily folded together so that it can be used for towing vehicles.

I have used the character 10 to designate the rear wheels of a service truck of any type, the character 11 indicating other portions of the vehicle, the character 12 indicating the floor of the rear end of the truck, the character 13 indicating the side walls. Bolted at 14 to the bottom wall 12 are the straps 15 which merge with the further lateral straps 16.

Welded to this framework are a pair of ears 17 to which are pivotally bolted at 18 the flanges 19 of the upwardly and angularly extending angle members 20 which are bent into the upwardly projecting portions 21, which are welded to the lengthened plates 22 and 23, these plates each including an opening 24, the plate 22 including pins 25 attached at 26 thereto (see Figure 3) and the plate 23 including the openings 27.

Also secured to the framework 15, 16 are the ears or brackets 28 to which are bolted for pivotal movement at 29 the further upwardly and angularly extending angles 30 which include the vertical portions 31 which also are correspondingly welded to the plates 22 and 23 as shown, the brackets 28 including openings 32 for the reception of suitable pins 33 to maintain the members in unfolded position as shown in Figure 4 so that they will not tend to close together during movement of the service truck.

When the device is to be used as a towing arrangement, the frameworks comprising the angles 20, 30, and plates 22 and 23 are pivoted towards each other on the various bolts 18 and 29 until the plates abut, whereupon the pins 25 will be guided into the openings 27, which will have the desirable effect of rigidifying the upper part of the arrangement during the pulling effort, thereby not requiring extra bolts or operations for this purpose. The hook 34 of the customary type is then placed through the openings 24, this hook being attached to the usual towing chain 35 which is attached to the lower hook 36 which is hooked under the bumper 37 of the towed vehicle. The vehicle is then towed, and it will be noted that due to the height of the openings 24, the downward pull by the vehicle will provide more traction for the wheels 10, and the lifting effort will also cause the drawn vehicle 38 to be pulled more easily.

After the towing operation is completed, the angles 20, 30 and plates 22 and 23 are separated after the hook 34 has been removed, the members being placed in the dotted position shown in Figure 4, and with the pins as explained maintaining these members in the position as shown in Figure 4. In this position the truck rear can be filled with any desired articles, since the space will now be cleared of the towing arrangement, which is especially desirable in service trucks, it being understood that this device can be attached to any type of service truck.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A collapsible towing frame for service trucks comprising a pair of opposed frameworks pivoted on the inside of said service truck and at the rear thereof, said frameworks adapted to fold towards each other in abutting relation whereby a towing chain can be attached at the point of abutment, said frameworks each including abutting plates attached thereto, said plates having forwardly positioned openings for the reception of a towing chain hook therein, one of said plates having further spaced openings, the other of said plates including pins received in said openings for rigidifying said towing frame.

2. A collapsible towing frame for service trucks comprising a pair of opposed frameworks pivoted on the inside of said service truck and at the rear thereof, said frameworks adapted to fold towards each other in abutting relation whereby a towing chain can be attached at the point of abutment, said frameworks each including abutting plates attached thereto, said plates having forwardly positioned openings for the reception of a towing chain hook therein, one of said plates having further spaced openings, the other of said plates including pins received in said openings for rigidifying said towing frame, a further horizontally positioned framework adapted to be bolted to the floor of said truck, ears attached to said further framework, said frameworks being pivoted to said ears, said frameworks each including a substantially vertically positioned member when in inoperative position, an angularly positioned member attached to said substantially vertically positioned member, the lower terminals of said members being pivoted to said ears.

References Cited in the file of this patent

UNITED STATES PATENTS

| 1,641,351 | Nilson | Sept. 6, 1927 |
| 2,509,435 | Huttinger | May 30, 1950 |

FOREIGN PATENTS

| 972,860 | France | Sept. 6, 1950 |